United States Patent [19]

Hung

[11] Patent Number: 5,445,281
[45] Date of Patent: Aug. 29, 1995

[54] LIGHT-DUTY ELECTRIC CRANE

[76] Inventor: Michael Hung, 9-16, Nan Kan Hsia, Nan Kan, Lu Chu Hsiang, Tao Yuan County, Taiwan

[21] Appl. No.: 314,683

[22] Filed: Sep. 29, 1994

[51] Int. Cl.6 .............................................. B66C 23/18
[52] U.S. Cl. .................................... 212/179; 212/249; 212/253; 212/285; 212/292
[58] Field of Search ............... 212/160, 179, 180, 181, 212/182, 187, 188, 222, 223, 229, 244, 249, 253, 254, 263, 266; 414/543; 267/141, 153

[56] References Cited

U.S. PATENT DOCUMENTS

| | | | |
|---|---|---|---|
| 2,565,091 | 8/1951 | Reed | 212/254 |
| 2,947,425 | 8/1960 | Nichols | 414/543 |
| 3,084,808 | 4/1963 | Peduzzi et al. | 212/254 |
| 3,338,542 | 8/1967 | Meinhard | 267/141 |
| 3,978,989 | 9/1976 | Avila | 212/179 |
| 4,069,922 | 1/1978 | Hawkins | 212/181 |
| 4,391,379 | 7/1983 | Paffrath | 212/187 |
| 4,419,038 | 12/1983 | Pendergraft | 212/266 |
| 4,560,074 | 12/1985 | Manning | 212/249 |
| 5,064,078 | 11/1991 | Van Staveren | 212/180 |

FOREIGN PATENT DOCUMENTS

| | | | |
|---|---|---|---|
| 61852 | 5/1968 | Germany | 212/223 |
| 216494 | 9/1991 | Japan | 212/180 |
| 2105679 | 3/1983 | United Kingdom | 212/188 |

*Primary Examiner*—Michael S. Huppert
*Assistant Examiner*—Thomas J. Brahan
*Attorney, Agent, or Firm*—Wenderoth, Lind & Ponack

[57] ABSTRACT

A light-duty electric crane structure includes a base, a supporting mast, a movable boom and an electric winch. The base is mountable onto a truck body, and the supporting mast is placed into a holding pipe of the base and can be rotatably adjusted relative thereto. A center portion of the supporting mast is provided with a manual lever for controlling rotation and lateral movement of the movable boom. The top of the supporting mast is provided with a supporting base for securing of the boom, and the center portion of the boom is provided with a platform for the mounting of the electric winch. The angle of inclination of the boom can be adjusted by a pin latch. A free end of the boom has pivotally mounted thereon a pulley through which is fed a hoisting rope of the winch. A load hook is attached to the end of the rope.

8 Claims, 5 Drawing Sheets

LIGHT-DUTY ELECTRIC CRANE

BACKGROUND OF THE INVENTION (a) Field of the Invention

The present invention relates to a structure of a light-duty electric crane, comprising a base, a supporting mast, a boom and an electric winch, for installation thereof in a light truck for hoisting objects.

(b) Description of the Prior Art

There are different types of derricks and cranes for use with different particular applications. The type that is most commonly seen is also the simplest and mainly includes a clamping base and a boom derrick to cooperate with pulleys, a motor and guy ropes. Such type crane is used for hoisting objects from a lower area to a higher area. Generally, heavy-duty cranes used in trucks are complicated and expensive, and such type of crane usually requires a hydraulic system for operation.

SUMMARY OF THE INVENTION

It is a general object of the invention to provide a light-duty electric crane structure comprising a base, a supporting mast, a movable boom and an electric winch. The electric winch is directly mounted on the boom and can be removed or re-installed with ease. The electric winch can also be controlled by a remote control unit for lifting and transporting operations. This is a practical design suitable for mounting on light trucks or agricultural trucks for raising, lowering or moving objects.

It is another object of the invention to provide a light-duty electric crane structure wherein the boom and the mast are connected together with pin latches. By adjusting the pin latches, the angle of inclination of the boom relative to the mast can be adjusted. The coupling is secure, and its adjustment is easy. The boom can be adjusted to swing upwardly, or it can be lowered to save space at a job site.

It is yet another object of the invention to provide a structure for a light-duty electric winch in which a base can be mounted on a truck body. In addition, a holding pipe is provided to cooperate with a pin latch so that the holding pipe can be coupled together with a mast. The end of the mast is secured with a bearing, and a center portion of the mast is provided with a lever. Thus, the bearing and the lever cooperate together so that the boom can be driven to move with the mast, making it convenient to lift and move objects.

BRIEF DESCRIPTION OF THE DRAWINGS

The invention, as well as its many advantages, will be further understood from the following detailed description and accompanying drawings, in which.

DETAILED DESCRIPTION OF THE PREFERRED EMBODIMENT

Figure 1:
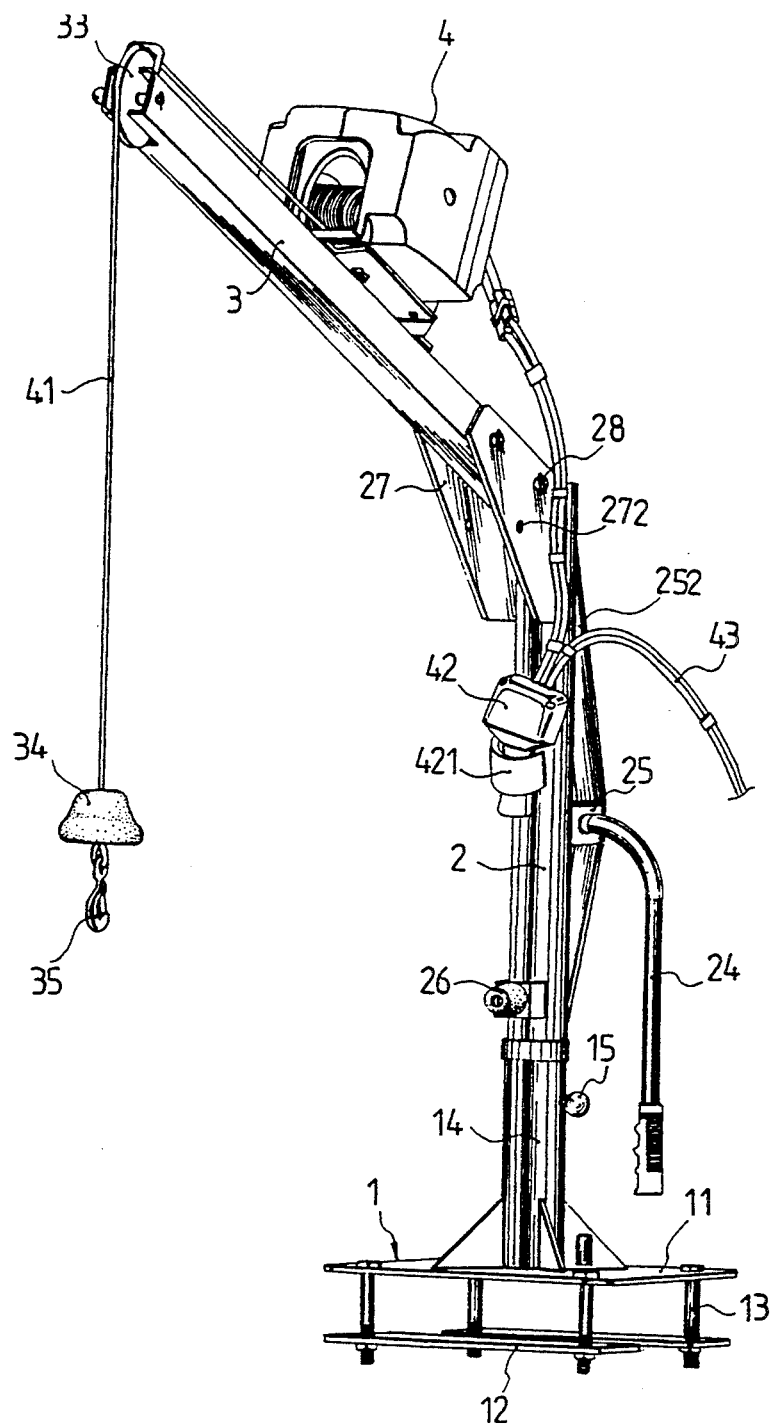
FIG. 1 is a perspective view of an assembly of an electric crane according to the present invention.

As shown in FIG. 1, an electric crane according to the present invention includes mainly a base 1, a supporting mast 2, a boom 3 and an electric winch 4.

Figure 2:
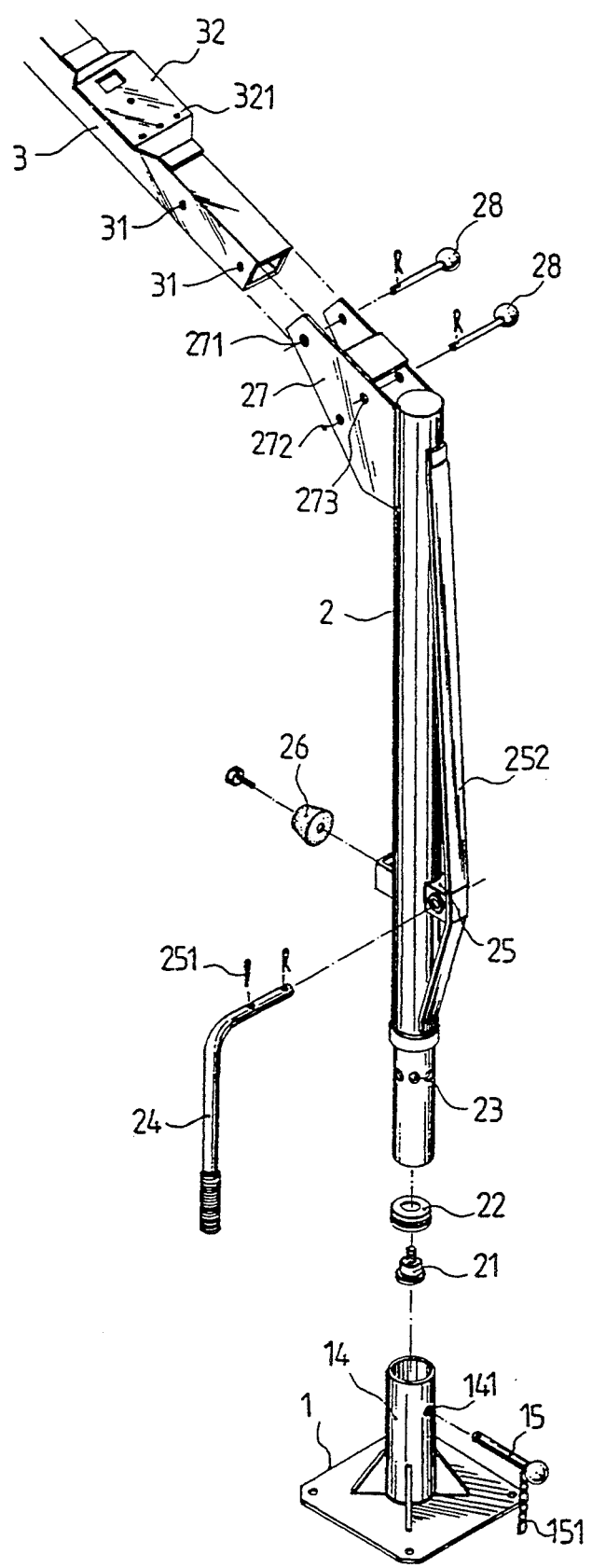
FIG. 2 is a perspective fragmented view showing a base, a supporting mast and a boom of the electric crane according to the present invention.
Figure 3:
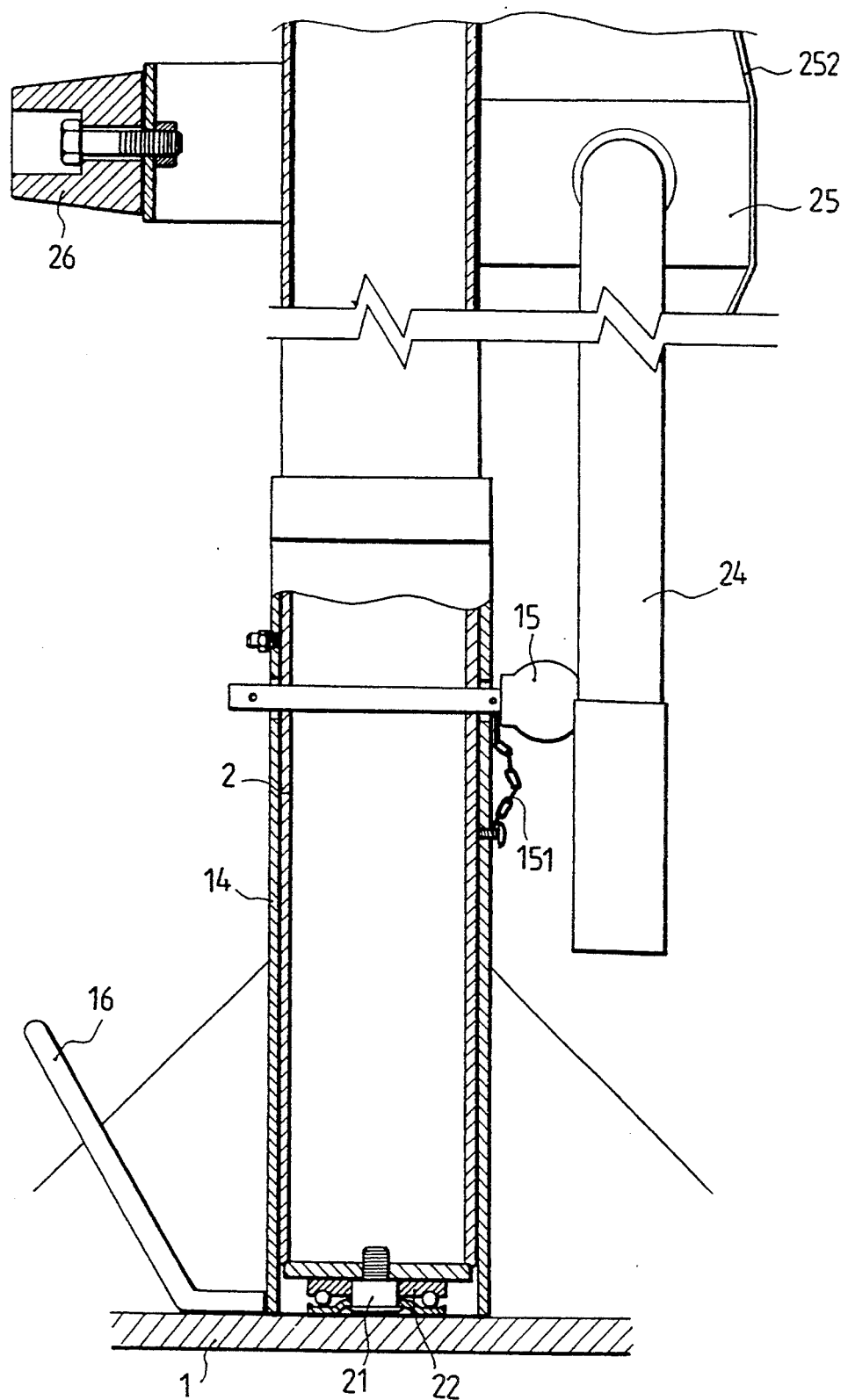
FIG. 3 is a sectional view showing the base and the supporting mast of the present invention.

The base 1 is provided with two plates 11 and 12, which cooperate with bolts 13 for mounting onto a truck body. As shown in FIG. 2, the top of the base 1 is provided with a holding pipe 14, which is provided with a pin hole 141 at a suitable location in the wall of the pipe. The pin hole 141 is provided for insertion of a pin latch 15 so that the supporting mast 2 can be secured when it is placed into the holding pipe 14. The pin latch 15 is connected to one end of a chain 151 as shown in FIG. 3. The other end of the chain 151 is secured to the wall of the holding pipe 14, so that when the pin latch 15 is pulled out the chain 151 maintains the pin latch 15 on pipe 14 to prevent latch 15 from becoming lost.

Figure 4:
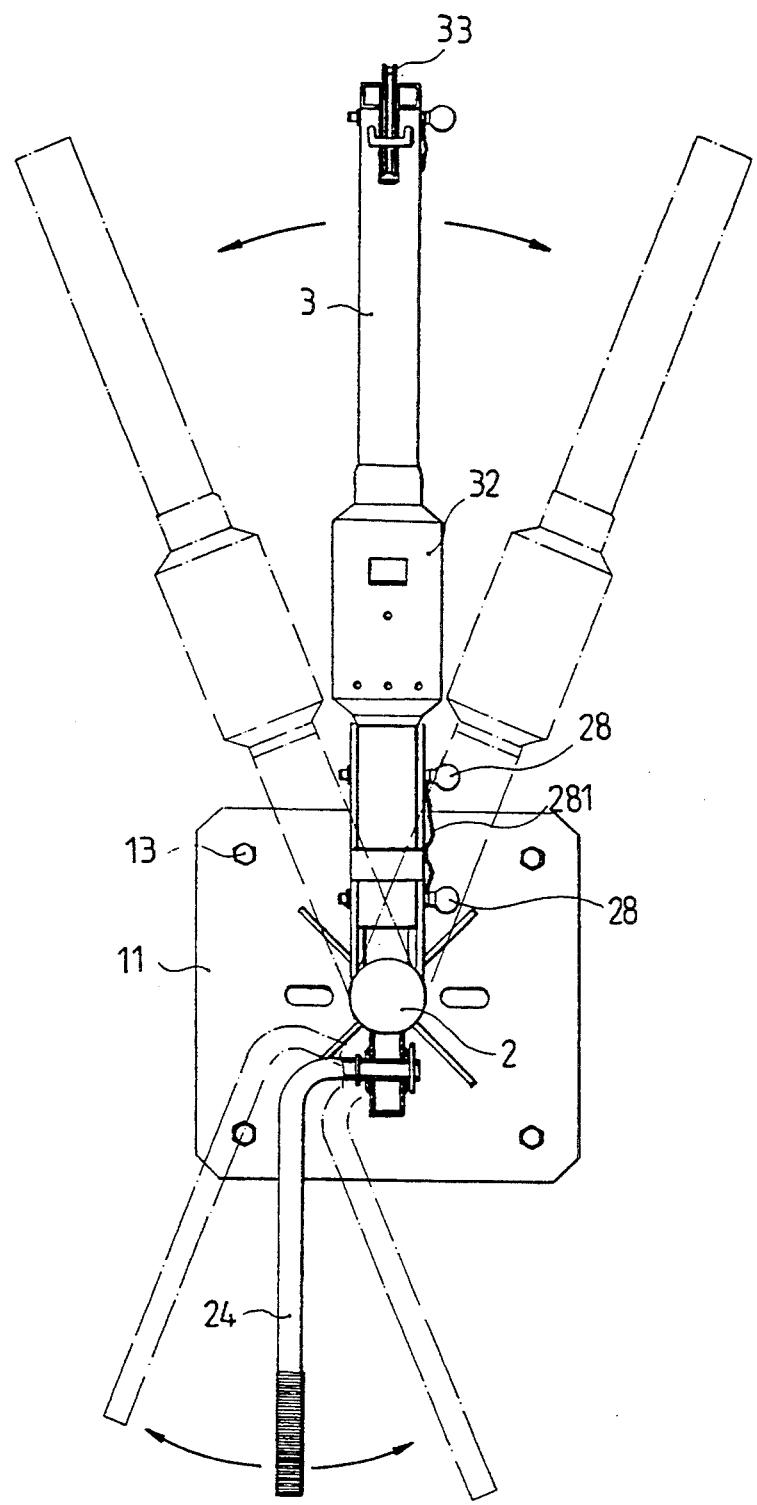
FIG. 4 is a schematic view illustrating side-to-side movement of the movable boom according to the present invention.

As shown in FIG. 2, one end of the supporting mast 2 is made to fit into the holding pipe 14, and the bottom of the mast 2 is provided with a bearing 22, which is secured with a nut 21. The wall of the mast adjacent such end thereof is provided with a plurality of pin holes 23, which are used to cooperate with pin hole 141 and latch 15 so that the mast can be secured in place in plural rotated positions relative to pipe 14. A manual L-shaped lever 24 is pivotally connected to a center portion of mast 2. One end of the manual lever 24 extends pivotally through a base or mount 25 at the center portion of the mast 2 and cooperates with securing latch devices 251 for secured mounting of lever 24. One side of base 25 is welded to a stiffening plate 252, and opposite ends of the stiffening plate 252 are welded to the supporting mast 2. In use, the manual lever 24 can be moved to a horizontal position (as shown in FIG. 4) for side-to-side movement resulting in rotation of mast 2 within and relative to pipe 14. With the bearing 22 provided on the bottom of the mast 2, the lever 24 can be used for the movement of the entire crane. In addition, the center portion of the supporting mast 2 is provided with a rubber protective pad 26, which is used as a stopper when the movable boom 3 is lowered in a vertical direction so as to avoid collision between boom 3 and mast 2. Also, the top of the mast 2 is also provided with a supporting base 27, which is inclined slightly in an upward direction. Two side walls of base 27 each are provided with three pin holes 271, 272, 273, which are arranged in a triangular pattern. Such pin holes, cooperating with a pin latch 28, are used to mount the boom 3 on the mast, so that boom 3 can be secured in place thereon and the angle of inclination thereof can be adjusted accordingly.

The movable boom 3 is provided at an inner end thereof with suitable pin holes 31 to be aligned with selected pin holes in base 27 so that boom 3 can be mounted on the supporting base 27 provided at the top of the mast 2. The center portion of the boom 3 is provided with a platform 32 which is provided with suitable screw holes 321 for cooperating with bolts for securing the electric winch 4 on platform 32. The front of boom 3 is provided with a pulley 33. A hoisting rope or cable 41 of the electric winch 4 feeds through the pulley 33. A weight block 34 and a hoisting hook 35 are attached to the free end of the hoisting rope 41.

The electric winch 4 is mounted on the platform 32 provided at the center portion of the movable boom 3. Winch 4 includes a remote control unit 42 and external wiring 43. The remote control unit 42 can be hung onto a hook 421 attached to the supporting mast 2. The lifting, lowering and moving of a load can be controlled by the remote control unit.

Figure 5:
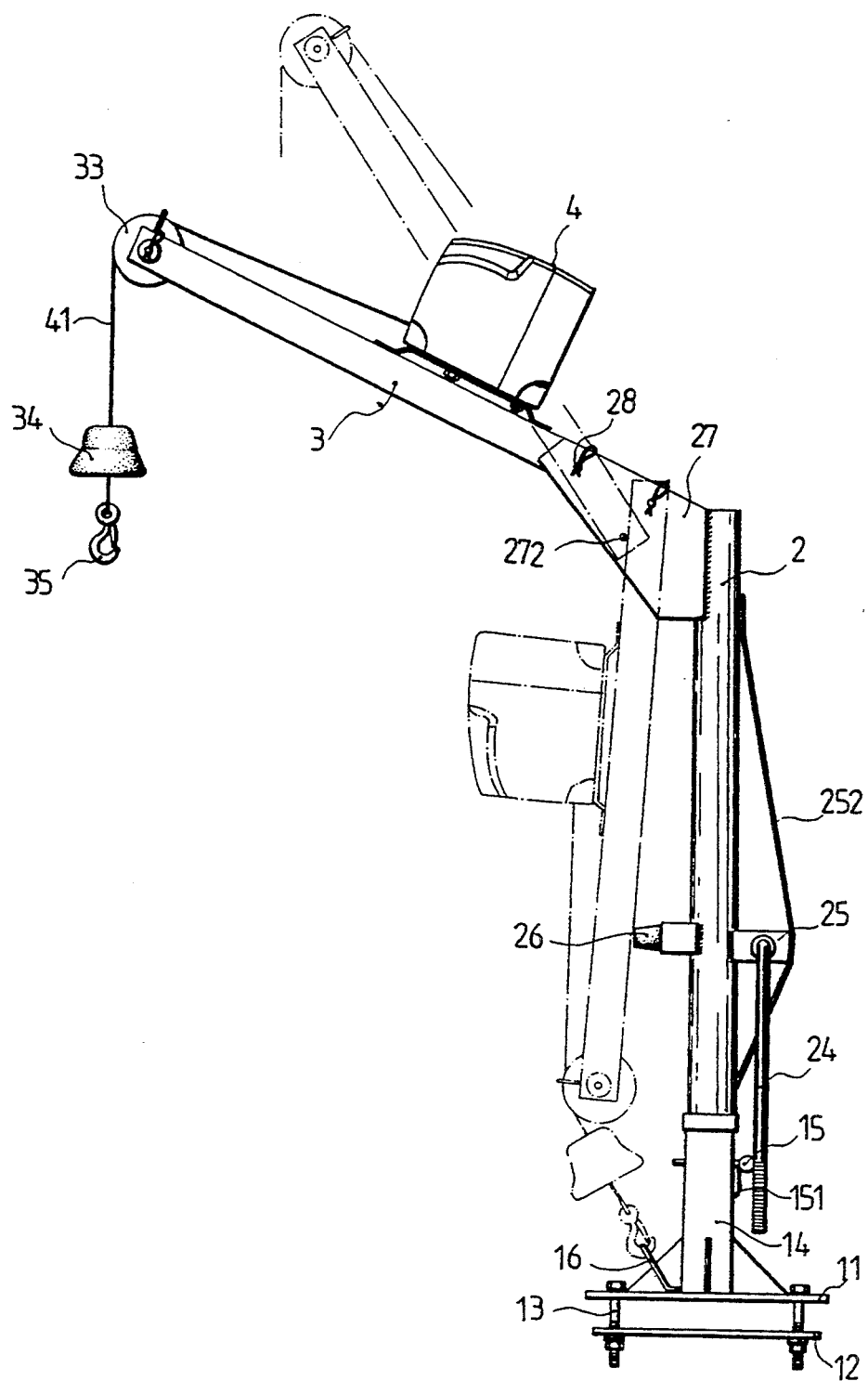
FIG. 5 is a schematic view showing adjustment of the angle and lowering of the boom.

By the above configuration, the light-duty crane can be mounted in a selected location of a truck body (such as a light truck or a truck for agricultural use). In use, the movable boom 3 can be pre-adjusted to lift upward, and the pin latch 15 of the holding base 14 can be removed, thereby allowing the hoisting rope 41 to be controlled by the remote control unit 42 with the cooperation of the electric winch 4. Thus, the load can be hoisted form a lower location to a higher location (or the load can be lowered from a high location to a lower location). In addition, the load can also be moved sideways by operation of the manual lever 24. When the entire crane assembly is not used, the boom 3 can be positioned vertically facing downward (as shown by dashed lines in FIG. 5) to thereby be able to use the space thereof for some other operation.

To adjust the inclined angle of boom 3, the pin latch 28 needs to be pulled out from pin hole 273 of the supporting base 27 on the top portion of the mast 2, allowing boom 3 to incline upwardly, and the pin latch 28 can then be reinserted into the lower pin hole 272. This enables the boom 3 to incline at a greater angle. If the boom 3 needs to be lowered, the pin latch 28 can be pulled from the lower pin hole, keeping only the pin latch 28 at the front end, and the boom 3 can then be positioned to face vertically downwardly, holding its position against the rubber protective pad 26. In addition, the base 1 can be provided with a chain hook 16 so that the hoisting hook 35 can be attached thereto. This is accomplished to avoid the movement of the movable boom 3. The electric winch is conveniently mounted so that it can be removed easily by removing bolts thereof, thereby to avoid the winch being stolen.

In addition, the above pin latches 15 and 28 are provided with respective chains 151 and 281, other ends of which are mounted at suitable locations such that when pin latches 15 and 28 are pulled out they will be prevented from becoming lost.

It is understood that the foregoing description and accompanying illustrations are merely exemplary, and that various changes and modifications to the preferred embodiments will be apparent to those skilled in the art. The scope of this invention is defined solely by the appended claims and their equivalents.

What is claimed is:
1. A light-duty electric crane comprising:
   a base mountable at a position of utilization, said base having fixed thereto and extending upwardly therefrom a holding pipe having therethrough a hole;
   a hollow supporting mast having a lower portion fitting into said holding pipe with said mast extending upwardly therefrom, said mast having therethrough a plurality of holes selectively alignable with said hole in said holding pipe;
   a manually operable lever pivotally mounted on said mast at a middle portion thereof and operable, upon being grasped by an operator, to enable said mast to be turned relative to said holding pipe to align a selected hole in said mast with said hole in said holding pipe;
   a bearing on a bottom end of said mast to facilitate turning of said mast relative to said holding pipe;
   a latch pin selectively insertable through said hole in said holding pipe and through a selected said hole in said mast aligned therewith, thus securing said mast to said holding pipe;
   a boom support at a top portion of said mast, said boom support comprising two spaced side walls non-adjustably fixed to said mast and extending therefrom in directions slightly inclined upwardly, said two side walls having therein aligned plural holes;
   a movable boom having a first end portion provided with plural holes selectively alignable with respective said holes in said two side walls, a center portion of said boom having thereon a support platform;
   latch pins selectively insertable through corresponding aligned said holes in said boom and said two side walls, thereby enabling selective adjustment of an angle of extension of said boom relative to said mast;
   a pulley mounted on a second end portion of said boom; and
   a winch removably mounted on said support platform, said winch having a hoisting cable feedable over said pulley with a weight block and a hoisting hook connected to a free end of said cable, and said winch including external wiring and a remote control unit to enable remote control operation.

2. A crane as claimed in claim 1, wherein said lever is L-shaped and includes a first portion pivotally extending into a base mount at said middle portion of said mast and a second, handle portion extending from said first portion.

3. A crane as claimed in claim 2, further comprising latch devices insertable through said first portion of said lever to enable selective mounting thereof.

4. A crane as claimed in claim 1, further comprising an elastic protective pad member mounted on said middle portion of said mast to provide a cushion for said boom when said boom is selectively moved to a vertical inoperative position thereof.

5. A crane as claimed in claim 1, wherein each said side wall has therein three said holes arranged in a triangular pattern.

6. A crane as claimed in claim 1, further comprising respective chains connecting said latch pins to said base and to said mast.

7. A crane as claimed in claim 1, further comprising a chain hook on said base for attachment thereto of said hoisting hook.

8. A crane as claimed in claim 1, further comprising a hook on said mast for support of said remote control unit.

* * * * *